United States Patent [19]

Khanna

[11] 3,858,059

[45] Dec. 31, 1974

[54] HIGH SPEED DRIVER CIRCUIT

[75] Inventor: Rakesh Khanna, Parsippany, N.J.

[73] Assignee: Litton Business Systems, Inc., Orange, N.J.

[22] Filed: Aug. 1, 1973

[21] Appl. No.: 384,699

[52] U.S. Cl. ............ 307/264, 307/DIG. 1, 307/255, 307/268, 307/270, 307/313

[51] Int. Cl. .......................... H03k 5/01, H03k 6/02

[58] Field of Search ............................ 307/253–255, 307/260 A, 263, 268, 264, 270, 313

[56] References Cited

UNITED STATES PATENTS

| | | | |
|---|---|---|---|
| 3,157,797 | 11/1964 | Eshelman | 307/254 X |
| 3,194,972 | 7/1965 | Buchmeyer | 307/255 |
| 3,194,979 | 7/1965 | Toy | 307/254 |
| 3,244,910 | 4/1966 | Leifer | 307/254 |

OTHER PUBLICATIONS

RCA Technical Notes, No. 102, April 1958, "Transistorized Filter for DC Power Supply" by H. J. Paz.

*Primary Examiner*—John Zazworsky
*Attorney, Agent, or Firm*—Norman Friedman; Stephen A. Roen; Robert F. Rotella

[57] ABSTRACT

A pulse driver circuit includes first, second and third switching means, said first switching means being responsive to a first and second predetermined amplitude level of an applied pulse signal for respectively assuming a first and second operating state, said second and third switch means being responsive to the operating state of said first switch means for selectively providing a circuit path coupling to one of two reference potentials in dependence upon the operating state of said first switch means so as to generate an output pulse signal corresponding to said applied input signal.

3 Claims, 3 Drawing Figures

HIGH SPEED DRIVER CIRCUIT

BACKGROUND OF THE INVENTION

This invention relates to signal translating circuits and in particular to a fast response buffer circuit for coupling a high frequency pulse signal to an output load circuit.

Buffer stages or circuits are generally required to provide isolation between a signal source and an output circuit into which the signal source is to operate. The isolation, of course, is required to prevent any interaction between the driving and driven circuits and thereby minimize any deleterious effects on the driven and driving circuits which may arise due to such interaction. Generally, where the driven output circuit is frequency sensitive, as, for example, where the output circuit is a capacitor or is capacitively coupled, and where the driving source signal is made up of high frequency components as, for example, a clocking pulse signal, there is the problem of a possible loading down of the source by the output circuit. A further problem is the possible material alteration of the waveform shape of the source signal due to changes in the rise and fall times of the signal as developed across the output load. In some applications the buffer stage may also be required for amplification or a desired change in the level of the source signal as developed across the output load.

Accordingly, it is an object of the present invention to provide a high speed driver circuit having application for coupling a high frequency pulse signal to an output load circuit without substantially altering the wave shape or rise and fall times of the coupled signal and to change the output signal level as required.

SUMMARY

Briefly described the invention includes first, second, and third switching means, said first switching means being responsive to a first and second predetermined amplitude level of an applied pulse signal for respectively assuming a first and second operating state, said second and third switch means being responsive to the operating state of said first switch means for selectively providing a circuit path coupling to one of two reference potentials in dependence upon the operating state of said first switch means so as to generate an output pulse signal corresponding to said applied input signal.

The novel features which are considered characteristic of the present invention are set forth with particularity in the appended claims. The invention itself, however, both as to its organization and method of operation as well as additional objects thereof will best be understood from the following description when read in connection with the accompanying drawings wherein:

DESCRIPTION OF AN ILLUSTRATIVE EMBODIMENT

Figure 1:
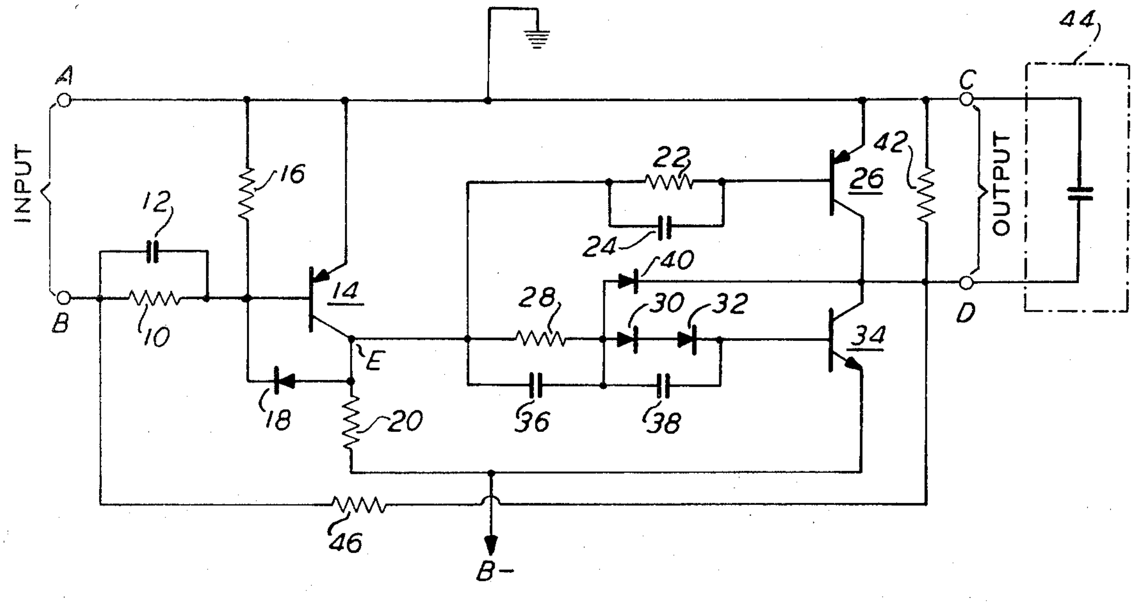
FIG. 1 is a schematic circuit diagram of a high speed driver circuit in accordance with the present invention.

Turning now to the schematic diagram of FIG. 1, a preferred embodiment of the circuit of the invention as illustrated therein will be seen to be operating from a negative potential source (B−) and will be described with respect to an applied negative going pulse signal to be coupled from a signal source (not shown) across terminals A and B, designated as the input to the driver circuit. It will be understood that the circuit will be equally operable in response to an applied positive going pulse signal, and can be adapted to operate from a positive potential source.

Terminal A is common to the circuit output terminal C and is connected to a reference potential designated as ground. The input to terminal B is coupled through the parallel combination of resistor 10 and a speed-up capacitor 12 to the base electrode of a first switching transistor 14. The emitter electrode of the transistor 14 is directly connected to ground; with the base electrode being connected through a bias resistor 16 to ground and also through a diode 18 to the collector electrode of the transistor 14, which is further connected through a current limiting resistor 20 to the source of negative operating potential B−.

The signal output from this first transistor 14 is taken at the collector electrode thereof (indicated at point E) and which is then coupled through the parallel combination of resistor 22 and capacitor 24 to the base electrode of a second switching transistor 26, and also through the series connection of a resistor 28 and diodes 30 and 32 to the base electrodes of a third switching transistor 34. A speed-up capacitor 36 is connected across resistor 28 and another speed-up capacitor 38 is connected across diodes 30 and 32. A third diode 40 is connected from the junction of resistor 28 and diode 30 to the collector electrodes of the transistors 26 and 34. The emitter electrode of the transistor 26 is returned directly to ground and the emitter electrode of the transistor 34 is returned to B−. A collector current limiting output resistor 42 is connected between the collector electrodes of the transistors 26 and 34 and ground. A capacitive output load 44 is shown as coupled across resistor 42 at the output terminals C and D of the illustrated circuit. A feed back resistor 46 is connected from the junction of the collector electrodes of transistors 26 and 34 at output terminal D to the input terminal B at the junction of resistor 10 and capacitor 12.

Operation of the circuit will now be described with reference to the schematic diagram of FIG. 1 and the waveform diagrams of FIGS. 2*a* and 2*b*.

Figures 2A, 2B:
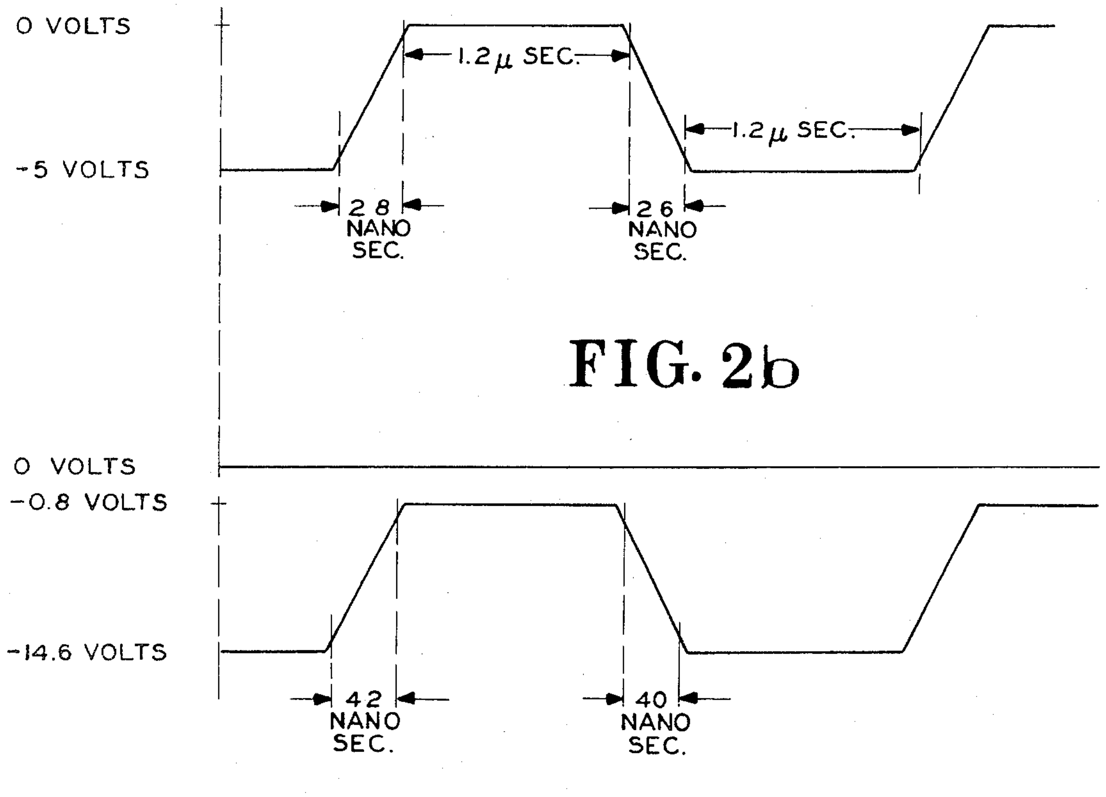
FIGS. 2*a* and 2*b* are potential waveform diagrams respectively showing an input signal and the corresponding signal at the output of the circuit of the invention loaded by a capacitor and indicating the relative rise and fall times of the signal after processing through the driver circuit.

It will be assumed for purposes of illustration that the signal to be applied to the driver circuit is a negative going pulse signal having a wave shape as shown for example in FIG. 2a, the amplitude or level of the signal varying between 0 and −5 volts.

The transistors 14, 26 and 34 operate as switching devices and are appropriately biased such that in the absence of an applied signal or at zero volt input, transistors 14 and 34 are turned "off" or are in a nonconducting state, and transistor 26 is turned "on" and in a saturated state so as to present a negligible impedance path or effective short circuit between its emitter and collector electrodes. The circuit arrangement is such that each transistor will switch from one state to the other in response to the presence or absence of a predetermined level of a signal applied to the base input of each of these transistors as will now be detailed.

With a zero level signal applied at the base input to the first switching transistor 14, the base input will be high or at ground potential relative to the negative going excursions of the signal to be coupled through the driver circuit. The transistor 14 is thus cut "off" or inhibited, while the second switching transistor 26 is in the "on" condition due to the presence of the negative B− supply voltage coupled to the base input thereof from the collector of transistor 14. The third switching transistor 34, being of opposite conductivity type than the second switching transistor 26, is also cut "off" or inhibited by the negative voltage at the base input thereof coupled from the collector of transistor 14. As the output of the circuit is taken at the junction of the collector electrodes of transistors 26 and 34, it will thus be seen that with transistor 34 "off" and transistor 26 "on," the output voltage of the circuit will be high or effectively zero in correspondence with the relative level of the applied input signal.

When the input signal applied to the base of the first switching transistor 14 is low or at its negative excursion of −5 volts, transistor 14 will be caused to turn "on" and driven into saturation causing the collector voltage at its output thereof to go high and approach the 0-volt or ground potential level. The 0-volt output of transistor 14 is coupled to the base to the second switching transistor 26 causing it to turn "off," and also to the base of the third switching transistor 34 causing it to turn "on." Thus, it will be seen that with transistor 26 "off" and transistor 34 "on," the voltage at the junction of said collectors will decrease or go low to approximately the B− supply for the circuit thereby again providing an output signal in correspondence with the relative polarity or level of the applied input signal.

With a capacitive load coupled across the circuit output terminals C and D and now looking at the charge path of the load capacitor through the third switching transistor 34, it will be seen that with this transistor heavily turned "on," the transistor presents a minimal impedence in series with the capacitive load and the B− supply, and thus the capacitor will charge rapidly through the transistor 34 towards the B−voltage.

When the applied input signal goes back to 0, and thus with the third switching transistor 34 turned "off" and the second transistor in an "on" condition it now presents a minimal impedance in series with the capacitor and thus provides a path for the rapid discharge thereof. It will be seen that by considering the high and low amplitude excursion of the input signal, that the output signal taken across the capacitive load will substantially follow the waveshape of the applied input signal, but with a change in relative levels depending upon the circuit components used and the B− operating supply.

Further in accordance with the circuit of the present invention and to insure a fast response in the switching of the transistors 14, 26 and 34 so that the signal developed across an output capacitive load will faithfully follow the applied input signal, a feedback resistor 46 is connected from the output terminal D at the junction of the collector electrodes of the transistors 26 and 34 to the input of the circuit at point B or alternatively (by a path not shown) to the base electrode of the first switching transistor 14. As soon as transistor 34 starts to turn "on," the output capacitive load starts to charge producing a current flow through resistor 46 which is fed back to the base of the first switching transistor 14 thereby to enhance the base current drive of the transistor and cause it to quickly go into saturation. Stated another way, the feedback resistor 46 couples the output signal back to the input to provide a fast switching of the first transistor 14 from its "off" condition to its "on" condition in response to the charging of the output capacitive load 44.

When the applied input signal to the circuit goes high or swings toward 0, the first switching transistor will start to turn "off." As transistor 14 turns "off," its collector voltage decreases or in this instance goes more negative and this voltage is coupled to the base of transistor 26 so as to turn it "on." As transistor 26 turns "on" its collector voltage rises toward the reference potential or 0 volts causing a decrease in the current fed back to the base of the first transistor 14 through the feed back resistor 46, thereby to speed-up the turning "off" of the first transistor.

Capacitor 12 in the input circuit of the first transistor 14 is provided to insure a fast transfer or coupling of the signal applied at the input terminal B to the base electrode of the transistor 14. Similarly, the capacitor 24 provides a fast coupling of the signal to the base of the second transistor 26 and capacitors 26 and 38 provide for a fast coupling of the signal to the base of the third transistor 34.

Diodes 30 and 32 which are in series with resistor 28 to the base input of transistor 34 in conjunction with diode 40 connected between the collector of transistor 34 and resistor 28 operate to prevent the transistor 34 from being oversaturated. With transistor 34 turned "on" it will be seen that the effect of the diodes is to maintain the voltage at the base electrode approximately 0.7 volts less positive than that at the collector electrode.

With the operating B− supply voltage and circuit components as herein below tabulated it has been found that the driver circuit above described effectively operates to couple an input pulse signal to an output load without substantially altering the rise and fall times of the signal as developed across the output load.

FIG. 2*b* illustrates the waveform and relative rise and fall times thereof as developed across an output capacitive load in response to an input waveform signal as shown in FIG. 2*a* and applied to the input of the above described driver circuit. It will be seen that for this example, the increase in the rise and fall time of the signal due to the presence of the driver stage is only 14 nano seconds while the level has undergone a change from −5 volts to 14.6 volts.

COMPONENTS

| | |
|---|---|
| Resistor 10 | 12,000 ohms |
| Resistor 16 | 2,000 ohms |
| Resistor 20 | 2,000 ohms |
| Resistor 22 | 1,000 ohms |
| Resistor 28 | 5,100 ohms |
| Resistor 42 | 9,100 ohms |
| Resistor 46 | 10,000 ohms |
| Capacitor 12 | 51 picofarads |
| Capacitor 24 | 0.001 micro farads |
| Capacitor 36 | 0.1 micro farads |
| Capacitor 38 | 430 picofarads |
| Capacitor 44 | 500 picofarads |

COMPONENTS-Continued

| | |
|---|---|
| Diode 18 | 1N4446 |
| Diode 30 | 1N4446 |
| Diode 32 | 1N4446 |
| Diode 40 | 1N4446 |
| Transistor 14 | MPS 6518* |
| Transistor 26 | MPS 6518* |
| Transistor 34 | MPS 6515* |
| Supply Voltage (B–) | –15.8 volts D.C. |

*(Manufactured by Motorola Semi-Conductor Products, Inc., Phoenix, Arizona)

What is claimed is:

1. A high speed driver circuit comprising:

input circuit means for receiving an input pulse signal;

means providing a source of first and second reference potentials;

first switch means coupled to said input circuit means and repsonsive to first and second pre-determined amplitude levels of said pulse signal for respectively assuming a first and second operating state;

second and third switch means each including a transistor having base, emitter, and collector electrodes, having a common output terminal and each responsive to the operating state of said first switch means for selectively providing a circuit path coupling to one or the other of said reference potentials in dependence on the operating state of said first switch means;

output circuit means coupled to said common output terminal and responsive to the switiched circuit path coupling of said second and third switch means for providing an output pulse signal corresponding to said received input signal; and means providing a signal feedback path between said input and output circuit means;

the emitter electrodes of said transistors being respectively coupled to a separate one of said first and second reference potentials, and the collector electrodes being connected together and coupled to said output circuit means, said second and third switch means transistors being biased to operate as switches and selectively provide a conductive path from said output circuit means to said first or second reference potentials in response to whether said first switch means is in its first or second operating state.

2. A driver circuit as set forth in claim 1 wherein said first switch means includes a transistor having base, emitter, and collector electrodes, said base electrode being coupled to said input circuit means, said transistor being biased to operate as a switch to provide a first output corresponding to a first operating state of conduction in response to the application to said input circuit means of said first amplitude level of said pulse signal and a second operating state of conduction in response to the application to said input circuit means of said second amplitude level of said pulse signal.

3. A driver circuit as set forth in claim 2 wherein said signal feedback means includes a resistor coupled between said input circuit means and the collector electrodes of said second and third switch means transistors.

* * * * *